United States Patent

[11] 3,574,373

| [72] | Inventors | Jean Le Derf;<br>Charles Soulier; Georges Trouillet,<br>Aulnoye-Aymeries (Nord), France |
|---|---|---|
| [21] | Appl. No. | 807,163 |
| [22] | Filed | Feb. 17, 1969 |
| [45] | Patented | Apr. 13, 1971 |
| [73] | Assignee | Societe anonyme dite: Vallourec (Usines a Tubes de Lorraine - Escaut et Vallourec Reunies). |
| [32] | Priority | Feb. 20, 1968 |
| [33] | | France |
| [31] | | 140490 |

[54] SEPARABLE CONNECTING DEVICE ESPECIALLY FOR COMPONENTS OF TUBULAR BRACES
8 Claims, 7 Drawing Figs.

[52] U.S. Cl........................................... 287/117, 285/333
[51] Int. Cl............................................ F16d 1/02
[50] Field of Search................................. 287/117, 125; 285/390, 334, 333, 355

[56] References Cited
UNITED STATES PATENTS

| 1,599,270 | 9/1926 | Axelson................ | 285/390X |
| 1,647,386 | 11/1927 | Weis..................... | 287/117X |
| 1,927,656 | 9/1933 | Eaton et al............ | 285/334X |
| 2,111,196 | 3/1938 | Texter................... | 285/334 |
| 2,187,798 | 1/1940 | Texter................... | 285/390X |
| 2,204,754 | 6/1940 | Frame.................. | 285/334 |
| 2,206,166 | 7/1940 | Dunn.................... | 285/390X |
| 2,211,179 | 8/1940 | Stone.................... | 285/334 |
| 2,259,232 | 10/1941 | Stone.................... | 285/390 |
| 2,267,923 | 12/1941 | Johnson................ | 285/334 |
| 3,114,566 | 12/1963 | Coberly et al......... | 285/334X |

*Primary Examiner*—Thomas F. Callaghan
*Assistant Examiner*—Andrew V. Kundrat
*Attorney*—Holcombe, Wetherill and Brisebois ABSTRACT: Separable connection device for elongated members to be used as ties or braces in which two members are assembled by means of a threaded sleeve bringing into abutment the extremities of said two elements. The threading for securing the sleeve to the members is cylindrical and the threads have a rectangular, square or trapezoidal section and a height (or depth) which decreases gradually until it becomes zero in the vicinity of at least one end of the threading.

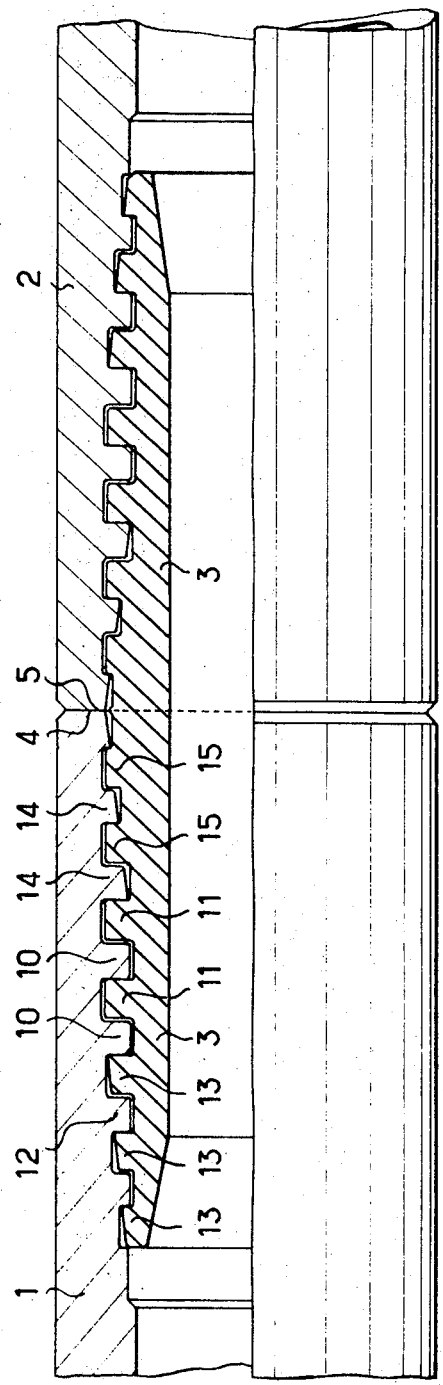
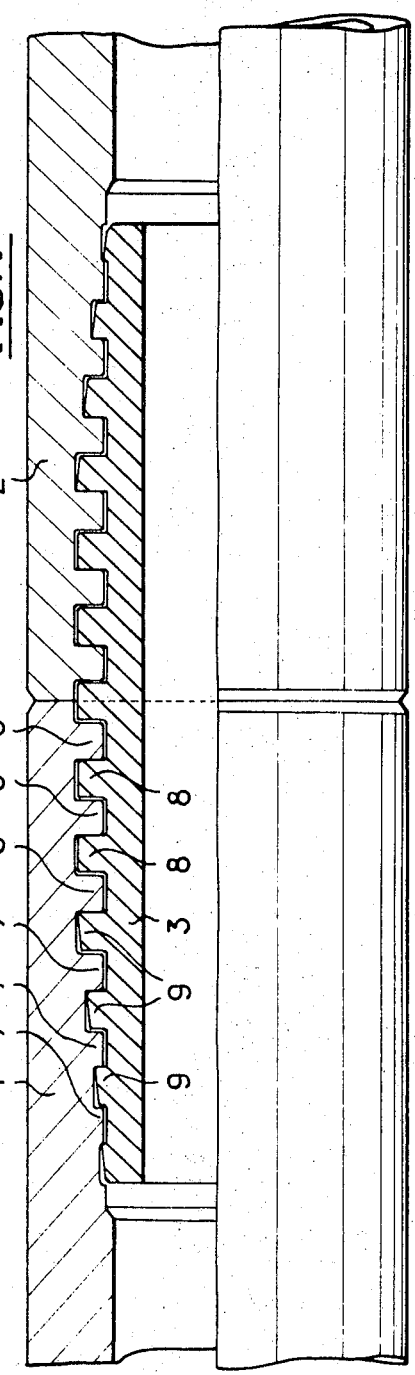
FIG. 6
FIG. 7

SEPARABLE CONNECTING DEVICE, ESPECIALLY FOR COMPONENTS OF TUBULAR BRACES

The present invention relates to a new connecting device, or to a joint, to connect pipe or rod components, especially designed for the construction of braces or ties. The connecting devices according to the invention may for example be used advantageously for the construction of anchoring braces or ties in public works. Such anchoring ties are especially used for supporting pile-plank walls.

According to a preferred embodiment of the invention, the ties or braces are made up of pipe components or elements--. Since these braces may be very long, that is to say have a length of the order of some dozen yards, for instance, it is necessary to make them in several sections.

Further they must be easy to assemble and to separate without requiring special tools.

The connecting devices according to the invention permit the assembly of the different components of the ties or braces without notably reducing the strength of these ties.

The invention has for its object to provide a connecting device or a joint, especially for components of ties or braces which comprise a sleeve each end of which is screwed onto an end of each of the two components or elements to be assembled by means of cylindrical threadings comprising trapezoidal, square or rectangular threads, said threadings having threads of decreasing height (or depth) at least for the connection with nonthreaded parts of the sleeve or of the components to connect.

The relative dimensions of the sleeve and of the ends of the elements or components to unite are such that the sleeve exerts in no case a radial strain (or a jamming strain) on the components to be assembled, since these components abut axially against each other before such jamming effect can begin.

In a preferred embodiment of the invention, the sleeve which surrounds the ends of the elements or components to be assembled comprises on each side of the median plane two symmetrical cylindrical threadings, the parts of these threadings located at each end of the sleeve terminating in tapered surfaces the vertices of which are directed to the center of the sleeve.

The corresponding threadings which are on the ends of the components to be assembled (which are preferrably tubular) are cylindrical threadings the depth of which decreases gradually from a certain point on, until the bottoms of the threads are brought into line with the outer surface of the components to be assembled.

In another embodiment of the invention, the sleeve is located inside of the pipe components which comprise cylindrical threadings the depth of which decreases gradually, from a certain point on, until the bottoms of the threads are brought into line with the inner surface of the components to be assembled.

In an alternative embodiment, it is possible to make threads of decreasing height (or depth) at the two ends of each of the threadings.

The total conicity according to which the height (or the depth) of the threads diminishes is preferably between 10 to 20 percent and is for example about 15 percent.

According to the invention the parts of the threadings on which the height (or depth) of the threads diminishes, should have a length which corresponds to at least one single turn and which is preferably between three and six turns. In practice, it is also desirable, in order to avoid a too great breadth of the threads, to make the part with threads of constant height (or depth) extend on a length which corresponds at least to one turn and a half.

The invention renders it possible to connect of tubular components or elements, which have a strength equal to about 90 percent of the strength of the components themselves, without any particular difficulty.

In order that the invention may be better understood one embodiment of the invention will now be described purely by way of illustration and with reference to the accompanying drawings, in which:

FIGS. 6 and 7 show two alternative embodiments in which the sleeve is located inside the tubular components or elements.

Figure 1:
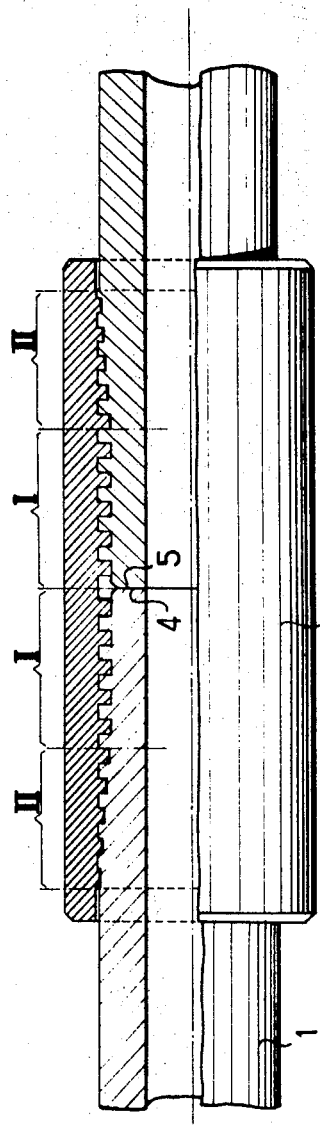
FIG. 1 is a view showing partially in section a connecting device according to the invention.

The embodiments of FIGS. 1 to 5 correspond to the connection of the two components or elements of the tubular ties or braces 1 and 2 by means of the sleeve 3 located outside.

The ends 4 and 5 of the components 1 and 2 engage each other and are axially pressed against each other.

The elements 1 and 2 are screwed on the sleeve 3 by means of cylindrical threadings the threads of which have rectangular sections.

The heights (or the depths) of the threads formed at the ends of elements 1 and 2 and at the center of sleeve 3 (section I, FIG. 1) are constant, that is to say that the threadings effected at this place are conventional cylindrical threadings.

On the contrary, the threads which are located at the ends of the sleeve 3 and at the base of the threadings of elements 1 and 2 have heights (or depths) which decrease regularly so that the threadings are brought in line, on the one hand, with the bores at the ends of the sleeve and, on the other hand, with the external surface of elements 2 and 3.

Figure 2:
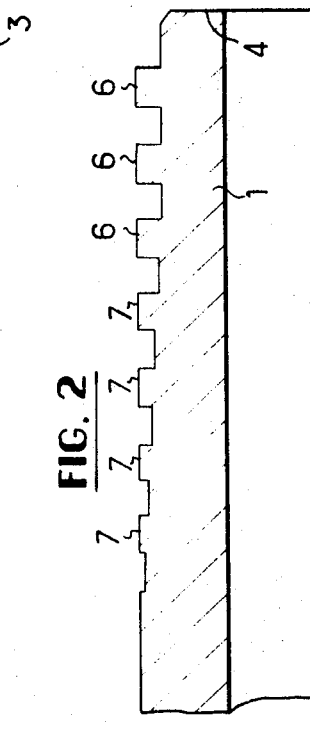
FIG. 2 is a view partially in section at a larger scale showing one of the main parts of a device analogous to the device of FIG. 1.
Figure 4:
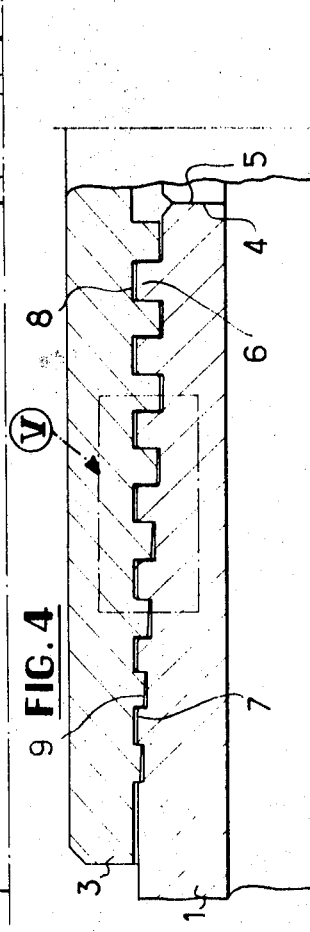
FIG. 4 shows the two parts of FIGS. 2 and 3 after assembly.

FIG. 2, shows the component or number 1 with its end plane 4, which comprises threads 6 of constant height in the vicinity of the end, whereas the height of the threads 7 decreases progressively when approaching the base of the threadings.

This can be easily achieved by machining the threading of the end of number 1 by means of a tool which is maintained at the same distance from the axis of element 1 for the machining of the threads 6, whereas it is gradually drawn back for the machining of the threads 7. As a result, the bottoms of the threads have a section the base of which is always parallel to the axis of the member.

Figure 3:
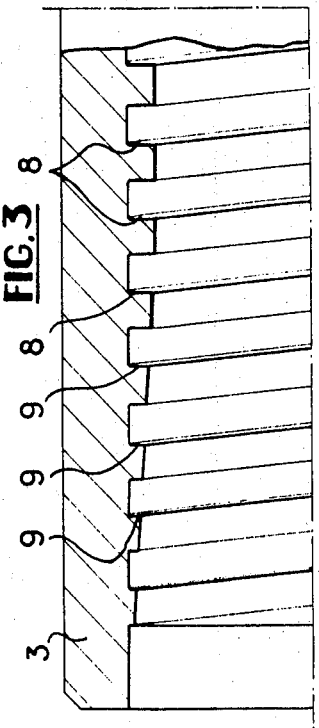
FIG. 3 is a partial section at a larger scale of the end of a sleeve analogous to the sleeve of FIG. 1.

Referring to FIG. 3, the sleeve 3 comprises at its central part threads 8 of constant height and threads 9 the height of which decreases gradually when moving towards the end of the sleeve.

This can be easily cut from a sleeve the internal surface of which is cylindrical in its central part and the extremities of which have a tapered flared shape, a cylindrical threading being then formed inside the sleeve.

In this case the crests of the threads 9 are slightly inclined since they are defined by a tapered surface.

Figure 5:
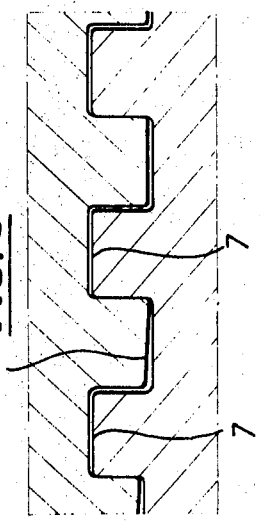
FIG. 5 is a section at a larger scale of part V of FIG. 4.

FIG. 5 shows the inclined top of thread 9 which is engaged in a hollow part the end of which is parallel to the axis of element 1.

According to the invention, the dimensions of the different members are such that there is no radial stress between the sleeve and the member to be assembled, in any case.

As a result, the parts of the threadings in which the heights (or depths) of the threads are gradually reduced do not function like conical threadings. This result is achieved since the extremities 4 and 5 of elements 1 and 2 abut against each other before the beginning of such an effect.

As one can see on FIG. 5, there is a clearance between the crests of the threads and the grooves between the threads and the assembly is only achieved by the contact of the flanks of the threads which ensures the resting of extremities 4 and 5 one against the other.

Owing to these features it is possible to assemble and separate the device according to the invention very easily, while providing a connection having a high mechanical strength.

Further, the device according to the invention is sufficiently fluidtight to conduct a fluid under pressure through members 1 and 2, which is designed to irrigate a boring tool positioned at the end of the string of members.

Two alternative embodiments are shown on FIGS. 6 and 7 in which the sleeve 3 is positioned inside the pipe components 1 and 2.

In the case of FIG. 6, the threadings comprise in their middle part threads 10 and 11 having a constant height (or depth) whereas they have at their ends threads 12, 13 and 14, 15 having decreasing heights (or depths).

In this case also, the parts of the threading where the threads have decreasing heights (or depths), do not function as conical threadings in view of the fact that the end 4 and 5 of members 1 and 2 abut against each other before a radial stress is exerted between the members or the components and the sleeve.

It is also possible, of course, to form threads of decreasing heights (or depths) at the two ends of the threadings in the case in which the sleeve 3 is positioned outside, as in FIG. 1.

FIG. 7 shows the case corresponding to FIG. 1 in which the threads 6 and 8 have constant heights (or depths) whereas the threads 7 and 9 have decreasing heights (or depths).

It is understood that the embodiments which have been described above are by no means limitative and that all desirable changes can be made without departing from the spirit of the invention.

Particularly and above all when the sleeve is positioned outside the elements to be assembled, these elements can be solid rods or bars instead of pipes or tubes.

Similarly it is obvious that the connecting device or joint according to the invention can be utilized not only for the connection of components of ties or braces to each others, but also for securing different members to these ties, such as for instance a boring head or a device which allows the fixing of the tie or the brace to the member it has to support.

Finally, it is clear that the assembly devices according to the invention are not limited to the case where the members to be assembled are constituted by ties or braces.

We claim:

1. Joint comprising a threaded sleeve and two elongated members having threaded end portions which abut each other when connected by said sleeve, the threads on each end portion being cylindrical and having at least those flanks facing away from the ends of said elongated members perpendicular to the axis of said joint;

the depth of the threads on said end portions increasing progressively toward the end of said members until they reach a depth which remains constant for at least part of the remainder of said end portions, and the crests of each of the threads of increasing and constant depth lying in the locus of a cylinder;

said sleeve having two cylindrically threaded sections in which at least those flanks facing away from the ends of said sleeve are perpendicular to the axis of said joint, with the threads in each section progressively increasing in height from the end of said sleeve until they reach a height which remains constant over at least part of the rest of said section, and the roots of each of said threads of increasing depth and constant depth lying in a cylindrical locus;

the threads of increasing depth on said elongated members being screwed into said threads of increasing height on said sleeve, and the threads of constant depth on said elongated members being screwed into said threads of constant height on said sleeve, so that the flanks of the threads on said elongated member which are perpendicular to the axis of said joint are in contact with the flanks of the threads on the sleeve which are perpendicular to the axis of said joint, but a clearance is left between the crests of said threads and the bottoms of the grooves in which said threads engage.

2. Joint as claimed in claim 1 in which elongated members are tubular.

3. Joint as claimed in claim 1 in which the sections in which the height of said threads changes comprises three to six complete turns.

4. Joint as claimed in claim 1 in which the sections in which the height of said threads remains constant comprises at least 1½ complete turns.

5. Joint as claimed in claim 1 in which the change in height of said threads represents a conicity of from 10 to 20 percent.

6. Joint as claimed in claim 1 in which the threaded portion of each elongated member terminates at the end of said member in a conically threaded section, the threads of which decrease in depth toward the end of said member, and said sleeve is provided on opposite sides of and adjacent its center, with sections of cylindrical threads which decrease in depth toward said center and intermesh with the threads in said conically threaded sections.

7. A connection device according to claim 1 wherein the sleeve is located outside the elements.

8. A connection device according to claim 1 wherein the sleeve is positioned inside the elements.